(12) United States Patent
Yamarthi et al.

(10) Patent No.: US 9,509,182 B2
(45) Date of Patent: Nov. 29, 2016

(54) TURBO-GENERATOR STATOR CORE SUSPENSION

(71) Applicant: General Electric Company, Schenectady, NY (US)

(72) Inventors: David Raju Yamarthi, Bangalore (IN); Lakshminarayana Kanakamedala, Glenville, NY (US); Anand Shankar Tanavde, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 14/089,742

(22) Filed: Nov. 25, 2013

(65) Prior Publication Data

US 2015/0145354 A1 May 28, 2015

(51) Int. Cl.
*H02K 1/18* (2006.01)
*H02K 5/24* (2006.01)

(52) U.S. Cl.
CPC ..................... *H02K 1/185* (2013.01)

(58) Field of Classification Search
CPC ........... H02K 1/185; H02K 1/24; H02K 5/24
USPC ................ 310/431, 423, 422, 413, 216.008, 310/216.009, 216.124, 216.129, 216.135, 310/113, 118, 52, 51, 91
See application file for complete search history.

(56) References Cited

U.S. PATENT DOCUMENTS

| | | | |
|---|---|---|---|
| 681,800 A * | 9/1901 | Lasche | H02K 1/16 174/DIG. 20 |
| 2,199,141 A | 4/1940 | Rice | |
| 2,199,156 A | 4/1940 | Grobel | |
| 2,199,351 A | 4/1940 | Taylor | |
| 2,424,299 A | 7/1947 | Baudry et al. | |
| 2,489,109 A | 11/1949 | Shildneck et al. | |

(Continued)

FOREIGN PATENT DOCUMENTS

| GB | 1162998 | 9/1969 |
|---|---|---|
| GB | 2470466 A | 11/2010 |

(Continued)

OTHER PUBLICATIONS

Legendre, Notice of Allowance and Fee(s) Due for U.S. Appl. No. 12/915,535, dated Apr. 30, 2014, 13 pages.

(Continued)

*Primary Examiner* — Terrance Kenerly
*Assistant Examiner* — Ahmed Elnakib
(74) *Attorney, Agent, or Firm* — Ernest G. Cusick; Hoffman Warnick LLC (57) ABSTRACT

Embodiments of the invention relate generally to turbo-generators and, more particularly, to suspension systems for turbo-generators and the attenuation of vibration in a stator core induced by an electromagnetic load. In one embodiment, the invention provides a support clamp comprising: an arcuate body; a first affixation point; a second affixation point; and a securing point between the first and second affixation points, wherein each of the first and second affixation points includes a radially-oriented opening extending from an inner surface to an outer surface and the securing point includes an area adjacent to an angled opening extending from a first surface to a second surface, each of the first and second surfaces lying substantially perpendicular to the inner and outer surfaces of the arcuate body.

13 Claims, 6 Drawing Sheets

(56) References Cited

U.S. PATENT DOCUMENTS

| | | | |
|---|---|---|---|
| 2,554,226 A | 5/1951 | Taylor | |
| 2,561,994 A | 7/1951 | Rashevsky et al. | |
| 2,811,658 A | 10/1957 | Brainard | |
| 2,811,659 A | 10/1957 | Barlow et al. | |
| 2,846,603 A | 8/1958 | Webster et al. | |
| 3,462,624 A | 8/1969 | Darrieus | |
| 3,531,667 A | 9/1970 | Barton et al. | |
| 3,652,889 A | 3/1972 | Reece et al. | |
| 3,708,707 A | 1/1973 | Kranz | |
| 3,988,622 A | 10/1976 | Starcevoc | |
| 4,110,652 A | 8/1978 | McGahern | |
| 4,204,313 A | 5/1980 | Khutoretsky et al. | |
| 4,425,523 A | 1/1984 | Detinko et al. | |
| 4,469,973 A | 9/1984 | Guyot et al. | |
| 4,536,671 A | 8/1985 | Miller | |
| 4,634,909 A | 1/1987 | Brem | |
| 4,663,553 A | 5/1987 | Zimmermann | |
| 4,891,540 A | 1/1990 | Cooper et al. | |
| 4,894,573 A * | 1/1990 | Simpson | H02K 1/185 29/596 |
| 5,796,191 A | 8/1998 | Schwanda | |
| 5,875,540 A | 3/1999 | Sargeant et al. | |
| 6,104,116 A | 8/2000 | Fuller et al. | |
| 6,144,129 A | 11/2000 | Fuller et al. | |
| 6,321,439 B1 | 11/2001 | Berrong et al. | |
| 6,346,760 B1 | 2/2002 | Boardman, IV | |
| 6,498,417 B2 | 12/2002 | Fuller | |
| 6,628,027 B2 | 9/2003 | Fuller | |
| 6,720,699 B1 | 4/2004 | Shah et al. | |
| 6,775,900 B2 | 8/2004 | Dawson et al. | |
| 7,202,587 B2 | 4/2007 | Sargeant et al. | |
| 7,302,754 B2 | 12/2007 | Majernik et al. | |
| 7,353,586 B2 | 4/2008 | Majernik et al. | |
| 7,397,163 B2 | 7/2008 | Cook et al. | |
| 7,714,477 B2 | 5/2010 | Nagashima et al. | |
| 7,827,676 B2 | 11/2010 | Allen et al. | |
| 7,923,890 B2 * | 4/2011 | Boardman, IV | H02K 1/185 310/216.129 |
| 7,923,891 B2 | 4/2011 | Kikuichi | |
| 7,946,028 B2 | 5/2011 | Majernik et al. | |
| 8,040,014 B2 | 10/2011 | Boardman, IV et al. | |
| 8,138,654 B2 | 3/2012 | Boardman, IV | |
| 8,258,680 B2 * | 9/2012 | Tanavde | H02K 1/185 254/199 |
| 8,319,405 B2 | 11/2012 | Allen et al. | |
| 8,941,282 B2 * | 1/2015 | Allen | H02K 1/16 310/216.008 |
| 2002/0135244 A1 | 9/2002 | Strong et al. | |
| 2011/0109187 A1 | 5/2011 | Tanavde et al. | |
| 2011/0210643 A1 | 9/2011 | Tanavde et al. | |
| 2012/0043861 A1 | 2/2012 | Allen et al. | |
| 2012/0104760 A1 | 5/2012 | Tanavde et al. | |
| 2014/0015356 A1 | 1/2014 | Chamberlin | |

FOREIGN PATENT DOCUMENTS

| | | |
|---|---|---|
| GB | 2470467 A | 11/2010 |
| GB | 2740466 A | 11/2010 |
| GB | 2475599 A | 5/2011 |
| GB | 2478191 A | 8/2011 |
| JP | S54162107 | 12/1979 |
| JP | 55086348 A | 6/1980 |
| JP | 61049629 | 3/1986 |
| JP | S61244238 | 10/1986 |
| JP | 62260538 A | 11/1987 |
| JP | 2007166726 A | 6/2007 |
| WO | 0057535 A1 | 9/2000 |

OTHER PUBLICATIONS

U.S. Appl. No. 13/934,189, Notice of Allowance dated Dec. 11, 2015, 30 pages.

Great Britain Intellectual Property Office, Search Report Under Section 17 for Application No. GB1118413.2 dated Feb. 23, 2012, 1 page.

Legendre, Notice of Allowance and Fee(s) Due for U.S. Appl. No. 12/915,535 dated Apr. 30, 2014, 13 pages.

U.S. Appl. No. 12/915,535, Notice of Allowance and Fees due dated Dec. 18, 2013.

DYWIDAG-Systems International, "DYWIDAG Post-Tensioning Systems; Multistrand Systems; Bar Systems; Repair and Strengthening," Apr. 2006, 31 pages, retrieved from: http://www.dsiamerica.com/uploads/media/DSI-USA__Bonded-Post-Tensioning-Systems_us_01.pdf.

Amsysco, "Material Properties of Post-Tension Strands," Jan. 2010, 3 pages, retrieved from: http://www.amsyscoinc.com/2010/01/29/material-properties-of-post-tension-strands/.

Post-Tensioning Institute, "What is Post-Tensioning?," Dec. 2000, 2 pages, retrieved from: http://www.dsiamerica.com/uploads/media/DSI-USA__What_is_Post-Tensioning_us_02.pdf.

VSL, "VSL Post-Tensioning Technology," 2013, 10 pages, retrieved from: http://www.vsl.com/index.php?option=com_content&task=blogcategory&id=17&itemid=86.

Tensioning Materials for Prestressed Concrete, "Ultra-high Strength Prestressing Strand," 1 page, retrieved from: http://www.sei-ssw.co.jp/en/pdf/prestressed_concrete_catalog_05.pdf.

Sumitomo Electric, "Super-High_Tension Prestressed Concrete Strand 15.7 mm in Diameter," 2013, 2 pages, Newsletter "SEI News," vol. 414, retrieved from: http://global-sei.com/sn/2012/414/3a.html.

Great Britain Intellectual Property Office, Search Report for Application No. GB1018954.6 dated Aug. 4, 2011, 3 pages.

Mullins, Office Action Communication for U.S. Appl. No. 12/622,751 dated Jan. 7, 2011, 11 pages.

Mullins, Office Action Communication for U.S. Appl. No. 12/622,751 dated May 20, 2011, 13 pages.

Mullins, Notice of Allowance and Fee(s) Due for U.S. Appl. No. 12/622,751 dated Jul. 18, 2011, 11 pages.

Legendre, Office Action Communication for U.S. Appl. No. 12/915,535 dated Sep. 18, 2013, 60 pages.

Great Britain Intellectual Property Office, Search Report for Application No. GB1103083.0 dated Jun. 24, 2011, 4 pages.

Andrews, Office Action Communication for U.S. Appl. No. 12/713,505 dated Jun. 21, 2011, 24 pages.

Great Britain Intellectual Property Office, Search Report for Application No. GB1018954.6 dated Mar. 9, 2011, 5 pages.

U.S. Appl. No. 13/934,192, Notice of Allowance dated May 25, 2016, 9 pages.

U.S. Appl. No. 13/934,192, Office Action 1 dated Feb. 17, 2016, 29 pages.

* cited by examiner

TURBO-GENERATOR STATOR CORE SUSPENSION

BACKGROUND

The stator cores of turbo-generators, e.g., electric power generators, experience vibration due to the electromagnetic load of the machine. Left unattenuated, this vibration is capable of causing fatigue in the stator core and frame, which can shorten its useful life.

Current attenuation systems include spring bars or similar devices affixed to the rigid stator frame structure surrounding the stator core. The components of such attenuation systems generally must be manufactured to small tolerances and are, therefore, relatively expensive to make, install, and service.

Applicants have found that attenuation equivalent or superior to that achievable using known attenuation systems may be achieved through the use of flexible wire members to attach the stator core to the surrounding rigid frame structure. The angling of wire members at various locations and at various angles between the stator core and the frame structure provides a tunable isolation system. In addition, wire members may be secured to the frame structure without the need for welding, reducing both construction time and material costs.

BRIEF DESCRIPTION OF THE INVENTION

In one embodiment, the invention provides a suspension system for a turbo-generator core, the system comprising: a rigid stator frame structure comprising: a plurality of rigid ring members surrounding and axially disposed along a stator core; and at least one rigid anchor member affixed between a first and a second of the plurality of ring members; a plurality of key bar members extending from a first end of the stator frame to a second end of the stator frame; a plurality of support clamps, each support clamp comprising: an arcuate body; a first point affixed to a first of the plurality of key bar members; a second point affixed to a second of the plurality of key bar members; and a securing point between the first point and the second point; at least one tension member comprising: at least one elongate wire member having a first end and a second end; a first securing member at the first end of the elongate wire member, securing the first end of the elongate wire member to the securing point of one of the plurality of support clamps; and a second securing member along a length of the elongate wire member, securing the elongate member to the at least one anchor member of the stator frame.

In another embodiment, the invention provides a support clamp for a turbo-generator suspension system, the support clamp comprising: an arcuate body; a first affixation point; a second affixation point; and a securing point between the first and second affixation points, wherein each of the first and second affixation points includes a radially-oriented opening extending from an inner surface to an outer surface and the securing point includes an area adjacent to an angled opening extending from a first surface to a second surface, each of the first and second surfaces lying substantially perpendicular to the inner and outer surfaces of the arcuate body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
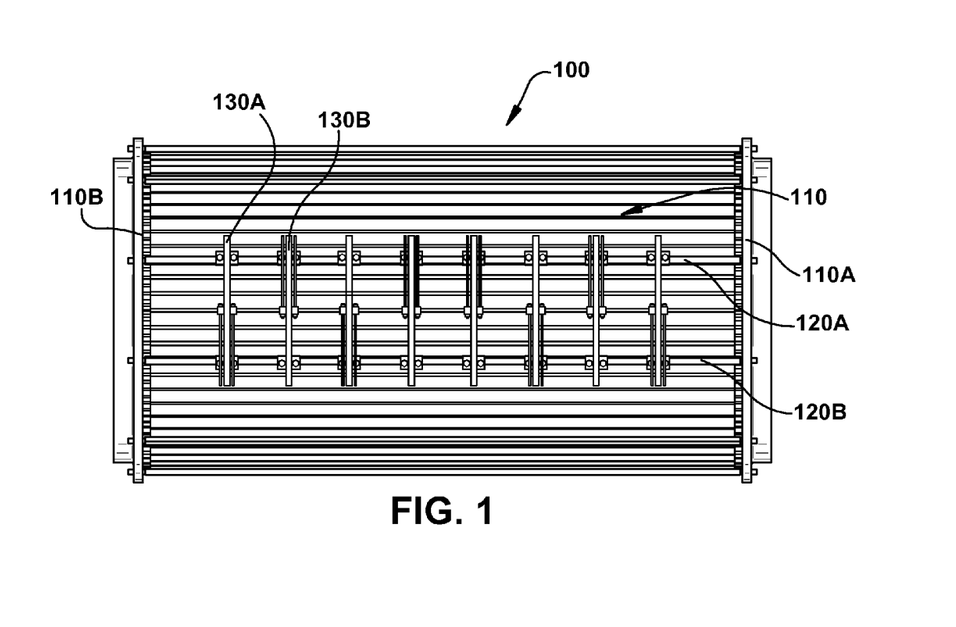
FIG. 1 shows a side view of a stator core and support system according to an embodiment of the invention.

Turning now to the drawings, FIG. 1 shows a side view of a stator core 110 and support system 100 according to an embodiment of the invention. Support system 100 includes a plurality of key bar members 120A, 120B extending from a first end 110A to a second end 110B of stator core 110. Affixed to key bar members 120A and 120B are a plurality of support clamps 130A, 130B, etc.

Figure 2:
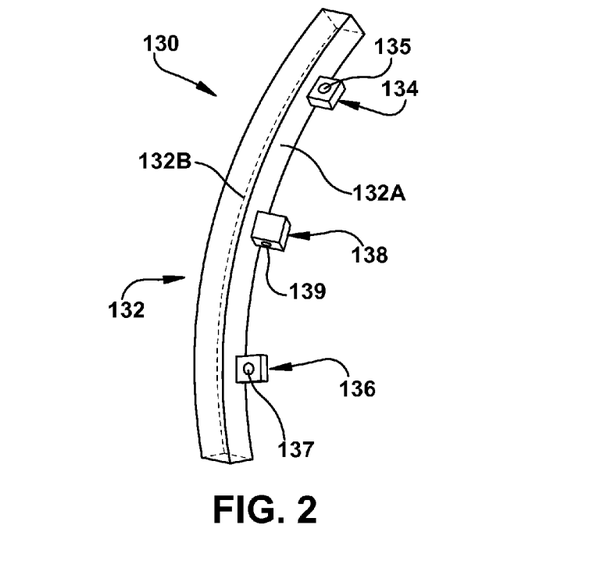
FIG. 2 shows a perspective view of a support clamp according to an embodiment of the invention.

FIG. 2 shows a detailed perspective view of a support clamp 130 according to an embodiment of the invention. Support clamp 130 includes an arcuate body 132 having a first surface 132A and a second surface 132B, and from which laterally extend a first affixation point 134, a second affixation point 136, and a securing point 138 therebetween. First and second affixation points are affixed to key bar members 120A and 120B (FIG. 1) using, for example, threaded members, welds, etc. One skilled in the art will recognize that any number of methods and techniques may be employed in affixing support clamp 130 to key bar members 120A and 120B, and will further recognize that such fixation may be permanent or non-permanent. For example, as shown in FIG. 2, support clamp 130 may be affixed to key bar members 120A and 120B by passing a threaded member, such as a bolt, through passages 135 and 137, respectively, and securing the threaded member to key bar members 120A and 120B.

Support clamp 130 further includes a securing point 138, shown in FIG. 2 as a member extending laterally from arcuate body 132. For the sake of simplicity in illustration, first and second affixation points 134, 136 and securing point 138 are shown only along one side of arcuate body 132. One skilled in the art will recognize, of course, that similar features may be disposed along the side of arcuate body 132 obscured in FIG. 2 and that such embodiments are intended to be within the scope of the invention.

Securing point 138 includes a passage 139 extending therethrough. As can be seen in FIG. 2, passage 139 of securing point 138 is oriented differently from passages 135 and 137 of first and second affixation points 134 and 136, respectively. As will be explained in greater detail below, while passages 135 and 137 of first and second affixation points 134 and 136 are typically oriented substantially along an axis substantially perpendicular to a longitudinal axis of stator core 110 and the turbo-generator's rotor (not shown), securing point 138, according to some embodiments of the invention, secures support clamp 130 (and stator core 110 to which it is affixed) to a rigid stator frame structure surrounding stator core 110 at an angle relative to an axis substantially perpendicular to a longitudinal axis of stator core 110 using one or more elongate, flexible wire members. As such, passage 139 of securing point 138 may be angled relative to an axis substantially perpendicular to a longitudinal axis of stator core 110.

Figure 3:
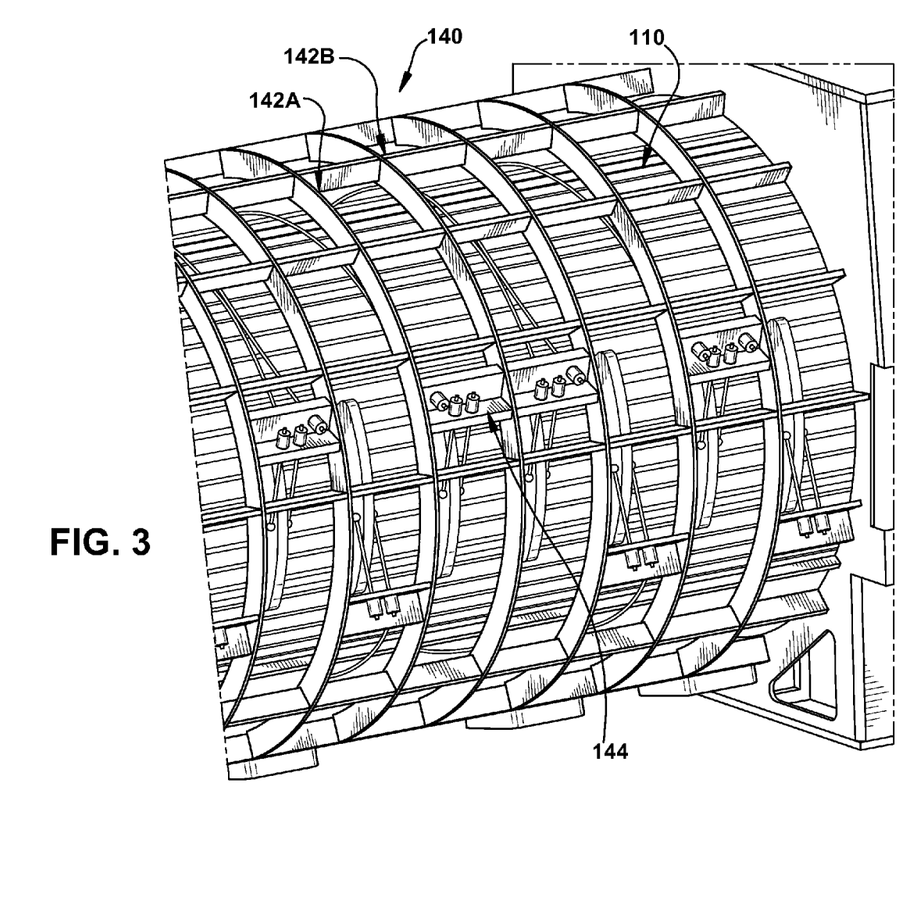
FIG. 3 shows a perspective view of a stator core and support system according to an embodiment of the invention.

For example, FIG. 3 shows a perspective view of stator core 110 surrounded by a rigid stator frame structure 140. Stator frame structure 140 includes a plurality of rigid ring members 142A, 142B, etc. surrounding and axially disposed along stator core 110. Stator frame structure 140 further includes at least one rigid anchor member 144 affixed between adjacent ring members 142A, 142B and oriented substantially parallel to a longitudinal axis of stator core 110.

Figure 4:
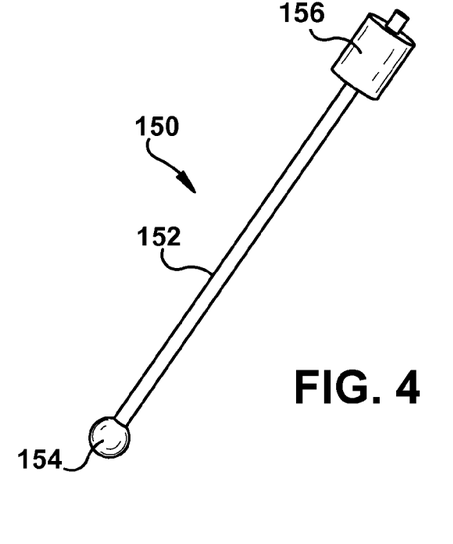
FIG. 4 shows a perspective view of a tension member according to an embodiment of the invention.

FIG. 4 shows a tension member 150 that may be used to secure stator core 110 to frame structure 140. As shown in FIG. 4, tension member 150 includes an elongate wire member 152 having first and second securing members 154, 156 at either end. In some embodiments of the invention, wire member 152 comprises wire rope made up of a plurality of braided or twisted metal strands which may or may not surround a solid, braided, or twisted metal core. Non-metal materials, such as polyethylenes and nylons, may also be employed in some embodiments of the invention. Other materials are possible, of course, and the term "wire member," as used herein, is intended to refer broadly to a flexible member.

As shown in FIG. 4, first securing member 154 comprises an "end button" or similar device to secure wire member 152 within a hole through which it is passed. That is, first securing member 154 has a diameter or dimension in at least one direction that is greater than wire member 152, such that wire member 152 may be passed through a hole or passage but which is too small to allow first securing member 154 to pass. Any number of securing devices or methods may be so employed, as will be recognized by one skilled in the art.

For example, referring back to FIG. 2, wire member 152 may be passed through passage 139 of securing point 138 of support clamp 130, such that first securing member 154 is held against securing point 138, thereby securing tension member 150 to support clamp 130.

Referring again to FIG. 4, second securing member 156, located some distance from first securing member 154, comprises a suspension anchor or similar device. Second securing member 156 acts similarly to first securing member 154 in securing wire member 152 within a hole through which it is passed. Second securing member 156 may comprise an anchor device, allowing pretensioning of wire member 152 using an external force, such as may be applied using a hydraulic pretensioner, and also maintain a high pretension on wire member 152. As will become apparent from the further description provided below, second securing member 156 is preferably moveable along wire member 152, such that, prior to attaching second securing member 156 to wire member 152, wire member 152 may be passed through a hole in anchor member 144 (FIG. 3) of stator frame structure 140 (FIG. 3) and tension applied to wire member 152. Upon attaching second securing member 156 to wire member 152, such tension is maintained on wire member 152 as second securing member 156 is held against anchor member 144, the diameter of which is greater than the hole in anchor member 144 through which wire member 152 is passed. Again, any number of securing devices or methods may be so employed, as will be recognized by one skilled in the art.

Second securing member 156 may include any apparatus or device and use any method to attach to wire member 152 including, for example, crimping, welding, bolting, the application of a compressive force, etc., as will be apparent to one skilled in the art.

Figure 5:
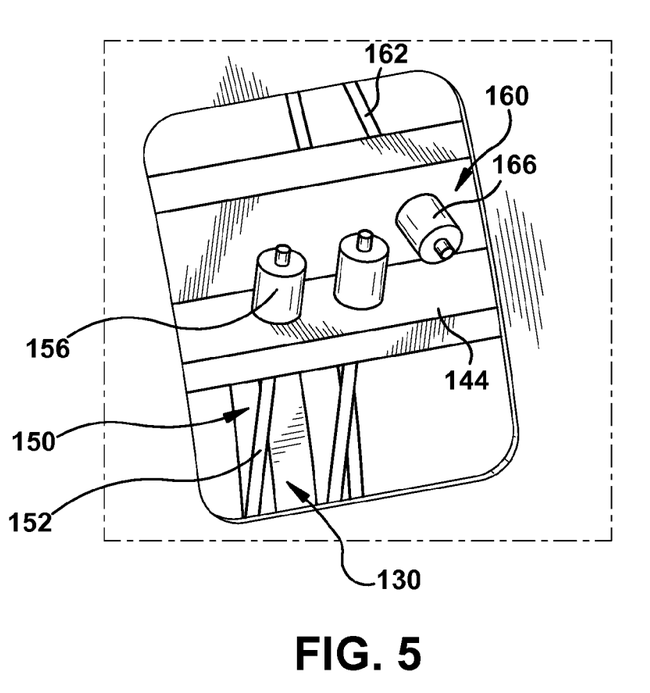
FIG. 5 shows a perspective view of the tension member of FIG. 4 secured to a stator frame structure.

FIG. 5 shows a perspective view of tension member 150 as secured to anchor member 144, according to one embodiment of the invention. As can be seen in FIG. 5, wire member 152 has been passed through a hole (not shown) in anchor member 144, with second securing member 156 attached to wire member 152 and held against anchor member 144. In this way, the vibration caused by the electromagnetic load of stator core 110 may be transferred to stator frame structure 140, and specifically to anchor member 144 of stator frame structure 140, using tension member 150, the first end of which (not shown) is secured to support clamp 130, as described above.

Still referring to FIG. 5, suspension systems according to some embodiments of the invention may further include one or more cable compression bands 160 comprising an elongate wire member 162 disposed about a circumference of stator core 110 and secured to anchor member 144 in a manner similar to the securing of tension member 150. Cable compression band 160 may, therefore, include a compression securing member 166 or similar device or apparatus. Cable compression band 160 acts to transfer at least a portion of the electromagnetic load of stator core 110 to stator frame structure 140. In some embodiments of the invention, both ends of the portion of wire member 162 surrounding stator core 110 may be secured to the same anchor member 144. In other embodiments, either end is secured to a different anchor member 144. According to some embodiments of the invention, wire member 162 may be tensioned at the same end at which it is secured to anchor member 144 in order to maintain tension on wire member 162.

Figure 6:
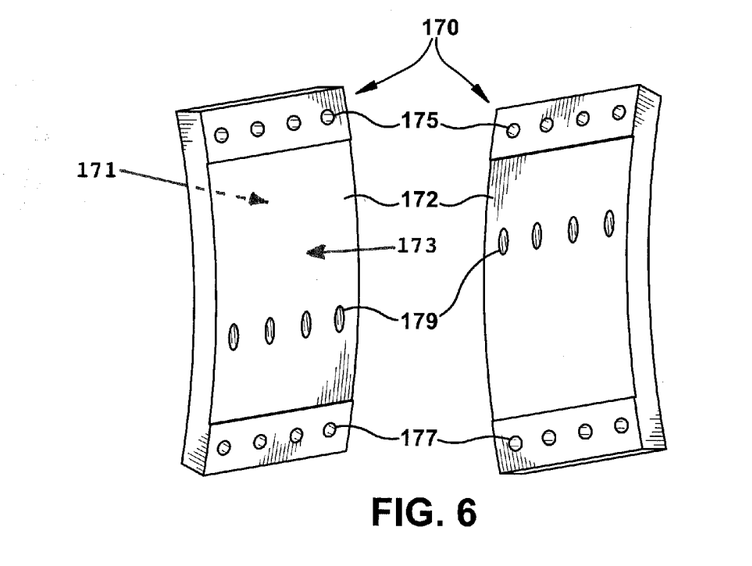
FIG. 6 shows perspective views of an arcuate plate member according to an embodiment of the invention.

FIG. 6 shows two perspective views of an arcuate plate member 170 for use in a support system according to one embodiment of the invention. Arcuate plate member 170 functions similarly to support clamp 130 (FIG. 2) and comprises an arcuate body 172, a first plurality of points 175 and a second plurality of points 177, as well as a plurality of securing points 179 between the first and second plurality of points 175, 177. Each of the first and second plurality of points 175, 177 and the plurality of securing points 179 includes a passage from an inner surface 171 to an outer surface 173 through body 172 of arcuate plate member 170, analogous to passages 135, 137, 139 of support clamp 130. The wider body 172 of arcuate plate member 170 affords a greater surface along which to secure a plurality of tension members 150 (FIGS. 3-4) without changing the relative radial position of the point at which such tension members are secured.

Figure 7:
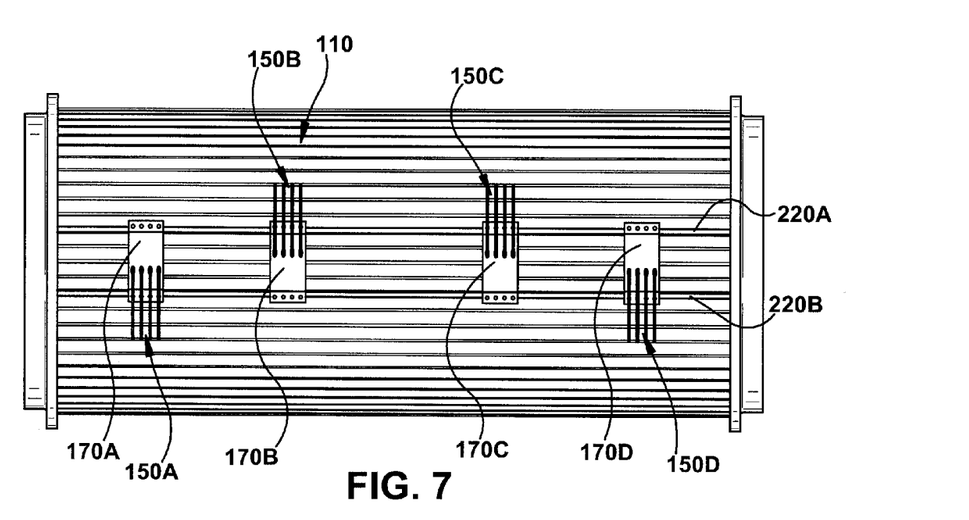
FIG. 7 shows a side view of the arcuate plate member of FIG. 6 secured to key bar members and a stator core.

FIG. 7 shows a plurality of arcuate plate members 170A, 170B, 170C, 170D affixed to key bar members 220A and 220B. Similar to support clamp 130, arcuate plate members 170A, 170B, 170C, 170D are affixed to key bar members 220A and 220B at the first and second plurality of points 175, 177 using, for example, threaded members, welds, etc. As can be seen in FIG. 7, arcuate plate members 170A and 170D include downwardly-angled securing points, such that tension members 150A and 150D passing therethrough are angled downward, while arcuate plate members 170B and 170C include upwardly-angled securing points, such that tension members 150B and 150C passing therethrough are angled upward.

One skilled in the art will recognize that similarly-constructed arcuate plate members 170 may be employed to both downwardly and upwardly angle the respective tension members by simply changing the orientation of the arcuate plate members 170. Similarly, arcuate plate members 170 may, according to some embodiments of the invention, include securing points 179 having differing (e.g., both upward and downward, differing upward, and/or differing downward) angles.

Figure 8:
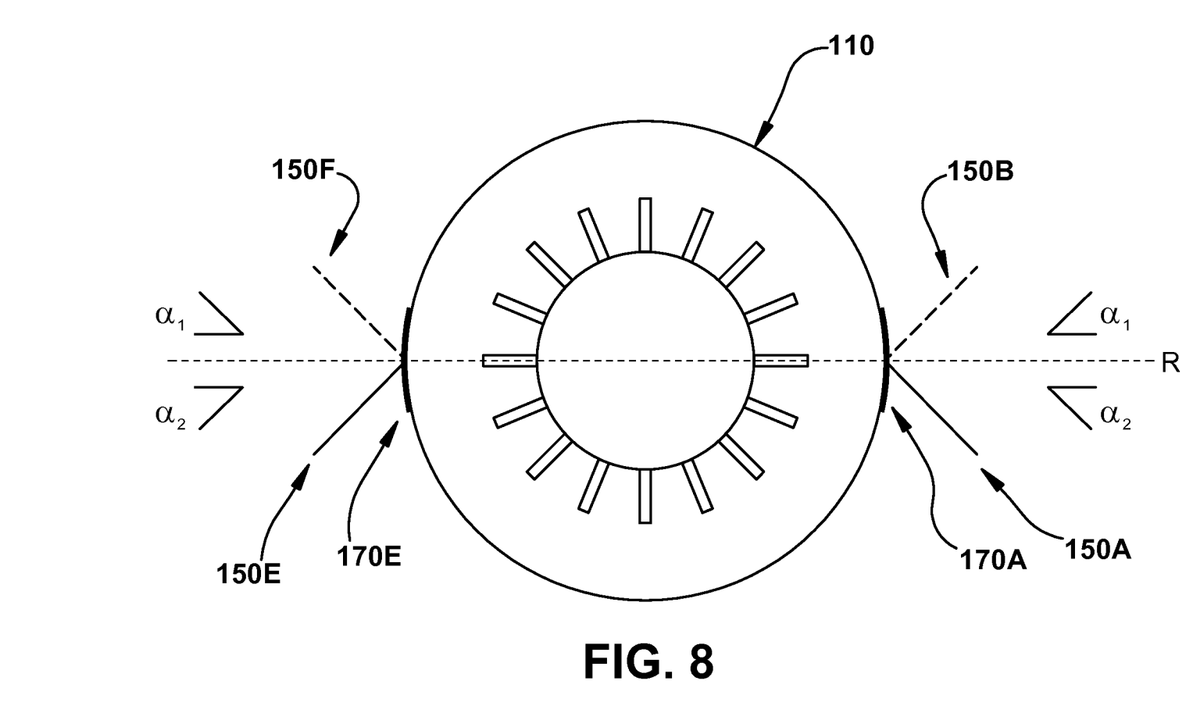
FIG. 8 shows a schematic cross-sectional view of a plurality of arcuate plate members in conjunction with a stator core according to an embodiment of the invention.

FIG. 8 shows a schematic cross-sectional view through a radial plane of stator core 110 according to one embodiment of the invention. As shown in FIG. 8, a plurality of arcuate plate members 170A, 170E are disposed about a circumference of stator core 110. According to some embodiments of the invention, including that shown in FIG. 8, arcuate plate members 170A, 170E are disposed about the circumference of stator core 110 on a radial axis R and along a longitudinal axis (not shown) of stator core 110. That is, arcuate plate members 170A, 170E are disposed at about the 9 o'clock and about the 3 o'clock positions, as seen through the radial plane of FIG. 8. Other circumferential positions for arcuate plate members may be employed, as will be recognized by one skilled in the art, those shown in FIG. 8 being merely for purposes of illustration.

One or more tension members 150A, 150B, 150E, 150F extend laterally from arcuate plate members 170A, 170E, respectively. Tension members 150B and 150F are shown in phantom and are disposed outside the plane of tension members 150A and 150E. Tension members 150B and 150F may be secured to arcuate plate members 170A and 170E, respectively, or may be secured to arcuate plate members (not shown) adjacent arcuate plate members 170A and 170E, respectively, along a longitudinal axis of stator core 110.

According to some embodiments of the invention, tension members 150A, 150B, 150E, 150F are angled with respect to radial axis R. As shown in FIG. 8, tension members 150B and 150F are angled upward from radial axis R at angle $\alpha_1$, while tension members 150A and 150E are angled downward from radial axis R at angle $\alpha_2$. According to some embodiments of the invention, angles $\alpha_1$ and $\alpha_2$ are, independently, between about 0° and about 90° with respect to radial axis R, e.g., between about 25° and about 75°, between about 45° and about 70°, about 70°, or about 65°.

One skilled in the art will recognize, of course, that the particular angle chosen for each of $\alpha_1$ and $\alpha_2$ will depend, for example, on the vibration caused by the electromagnetic load of stator core 110 to be transferred to stator frame structure 140 (FIG. 3), the number and arrangement of support clamps 130 (FIG. 2) and/or arcuate plate members 170, the number and arrangement of tension members 150, the composition of wire members 152 (FIG. 4) of tension members 150, etc. Applicants have found, in the applications in which embodiments of the invention have been employed and the degree of vibration attenuation measured, that angles of between about 0° and about 90° for each of $\alpha_1$ and $\alpha_2$, e.g., between about 60° and about 75°, afford a degree of attenuation equal to or greater than that achievable using known attenuation methods. In other applications of the various embodiments of the invention, angles less than 60° and/or greater than 75° would be similarly efficacious.

In most applications in which embodiments of the invention may be employed, the greatest degree of vibration attenuation is achievable where the tension applied to each tension member 150 is substantially the same.

Figure 9:
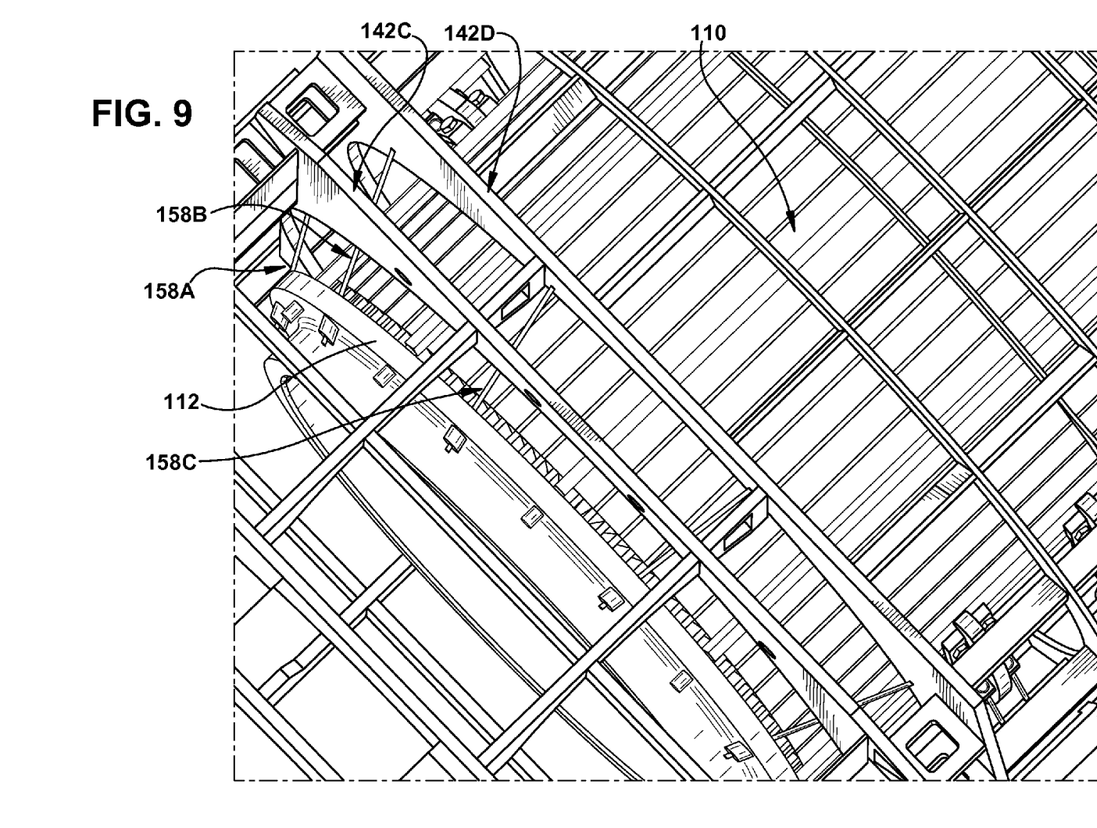
FIG. 9 shows a top perspective view of a suspension system having axial tension members according to an embodiment of the invention.

Support systems according to some embodiments of the invention may further comprise one or more axial tension members. FIG. 9 shows a top perspective view of such axial tension members 158A, 158B, 158C, etc. secured between a flange 112 or similar feature adjacent an end of stator core 110 and a rigid ring member 142D of stator frame structure 140 (FIG. 3). Axial tension members 158A, 158B, 158C, etc. may be secured between flange 112 and rigid ring member 142D in a manner similar to that described above with respect to the securing of tension member 150 (FIG. 5) between anchor member 144 (FIG. 5) and support clamp 130 (FIG. 2). Axial tension members provide additional transfer of the electromagnetic load of stator core 110 to the stator frame structure 140.

Applicants tested embodiments of the invention in various applications and found that, across a frequency range of 80 Hz to 140 Hz, vibrations in the stator core were attenuated to a degree equal to or greater than known suspension systems and methods.

The terminology used herein is for the purpose of describing particular embodiments only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A suspension system for a turbo-generator core, the system comprising:
    a rigid stator frame structure comprising:
        a plurality of rigid ring members surrounding and axially disposed along a stator core; and
        at least one rigid anchor member affixed between a first and a second of the plurality of ring members;
    a plurality of key bar members extending from a first end of the stator frame to a second end of the stator frame;
    a plurality of support clamps including a first plurality of support clamps disposed along a first side of the stator frame and a second plurality of support clamps disposed along a second side of the stator frame, such that the first and second pluralities of support clamps are disposed along a substantially horizontal plane of the stator core, each support clamp comprising:

an arcuate body;
a first point affixed to a first of the plurality of key bar members;
a second point affixed to a second of the plurality of key bar members; and
a securing point between the first point and the second point;
at least one tension member comprising:
at least one elongate wire member having a first end and a second end;
a first securing member at the first end of the elongate wire member, securing the first end of the elongate wire member to the securing point of one of the plurality of support clamps; and
a second securing member along a length of the elongate wire member, securing the elongate member to the at least one anchor member of the stator frame,
wherein the at least one tension member includes a first tension member having a first elongate wire member secured to a first of the first plurality of support clamps and a first anchor member; and a second tension member having a second elongate wire member secured to one of the second plurality of support claims and a second anchor member.

2. The suspension system of claim 1, wherein the at least one elongate wire member is angled with respect to an axis substantially perpendicular to a longitudinal axis of the stator core.

3. The suspension system of claim 1, wherein the at least one tension member further includes:
a third tension member having a third elongate wire member secured to a second of the first plurality of support clamps and a third anchor member, wherein the second of the first plurality of support clamps is adjacent the first of the first plurality of support clamps.

4. The suspension system of claim 3, wherein each of the first, second, and third elongate wire members is angled with respect to an axis substantially perpendicular to a longitudinal axis of the stator core.

5. The suspension system of claim 4, wherein each of the first, second, and third elongate wire members is angled between about 0 degrees and about 90 degrees with respect to the radial axis of the stator core.

6. The suspension system of claim 5, wherein each of the first, second, and third elongate wire members is angled about 45 degrees with respect to the radial axis of the stator core.

7. The suspension system of claim 1, wherein the at least one elongate wire member is selected from a group consisting of: a solid metal wire, a twisted metal wire, a braided metal wire, a polyethylene wire rope, and wire rope comprising nylon fibers.

8. The suspension system of claim 1, further comprising:
at least one axial tension member extending from a flange of the stator core to one of the plurality of rigid ring members surrounding and axially disposed along the stator core.

9. The suspension system of claim 8, wherein the at least one axial tension member includes:
a first axial tension member extending from the flange of the stator core to a first rigid ring member nearest the flange; and
a second axial tension member extending from the flange of the stator core to a second rigid ring member adjacent the first rigid ring member.

10. The suspension system of claim 8, wherein the at least one axial tension member includes a wire member selected from a group consisting of: a solid metal wire, a twisted metal wire, a braided metal wire, a polyethylene wire rope, and wire rope comprising nylon fibers.

11. The suspension system of claim 1, further comprising:
an elongate wire member disposed about a circumference of the stator core and secured at either end to the at least one rigid anchor member.

12. The suspension system of claim 11, wherein the ends of the elongate wire member are secured to different rigid anchor members.

13. The suspension system of claim 1, wherein the plurality of support clamps comprises at least one arcuate plate member, wherein the securing point comprises an inner surface of the arcuate plate member adjacent to a passage extending from the inner surface of the arcuate plate member to an outer surface of the arcuate plate member.

* * * * *